March 4, 1969 T. P. MILLER 3,431,363

NOR LOGIC SCREENING TRANSLATOR

Filed June 14, 1965 Sheet 1 of 2

INVENTOR
THOMAS P. MILLER
BY
ATTORNEY

United States Patent Office 3,431,363
Patented Mar. 4, 1969

3,431,363
NOR LOGIC SCREENING TRANSLATOR

Thomas P. Miller, Jackson, Tenn., assignor to International Telephone and Telegraph Corporation, New York, N.Y., a corporation of Maryland Filed June 14, 1965, Ser. No. 463,966
U.S. Cl. 179—18 8 Claims
Int. Cl. H04m 3/00, 3/56, 5/00

ABSTRACT OF THE DISCLOSURE

A matrix is equipped with crosspoint diodes connected in coded combinations which identify subscriber stations by groups or classes. Relay NOR logic is connected to the matrix outlets so that all relays operate except the one which identifies the class of the pertinent calling line. In the described case, the calls from mobile subscribers are classified, according to their area code, to indicate whether the mobile stations are in home areas, in adjacent areas, or are in completely foreign areas. The translator could also be used to screen home subscribers, according to area codes, in order to indicate whether toll ticketing is or is not required.

Figure 1:
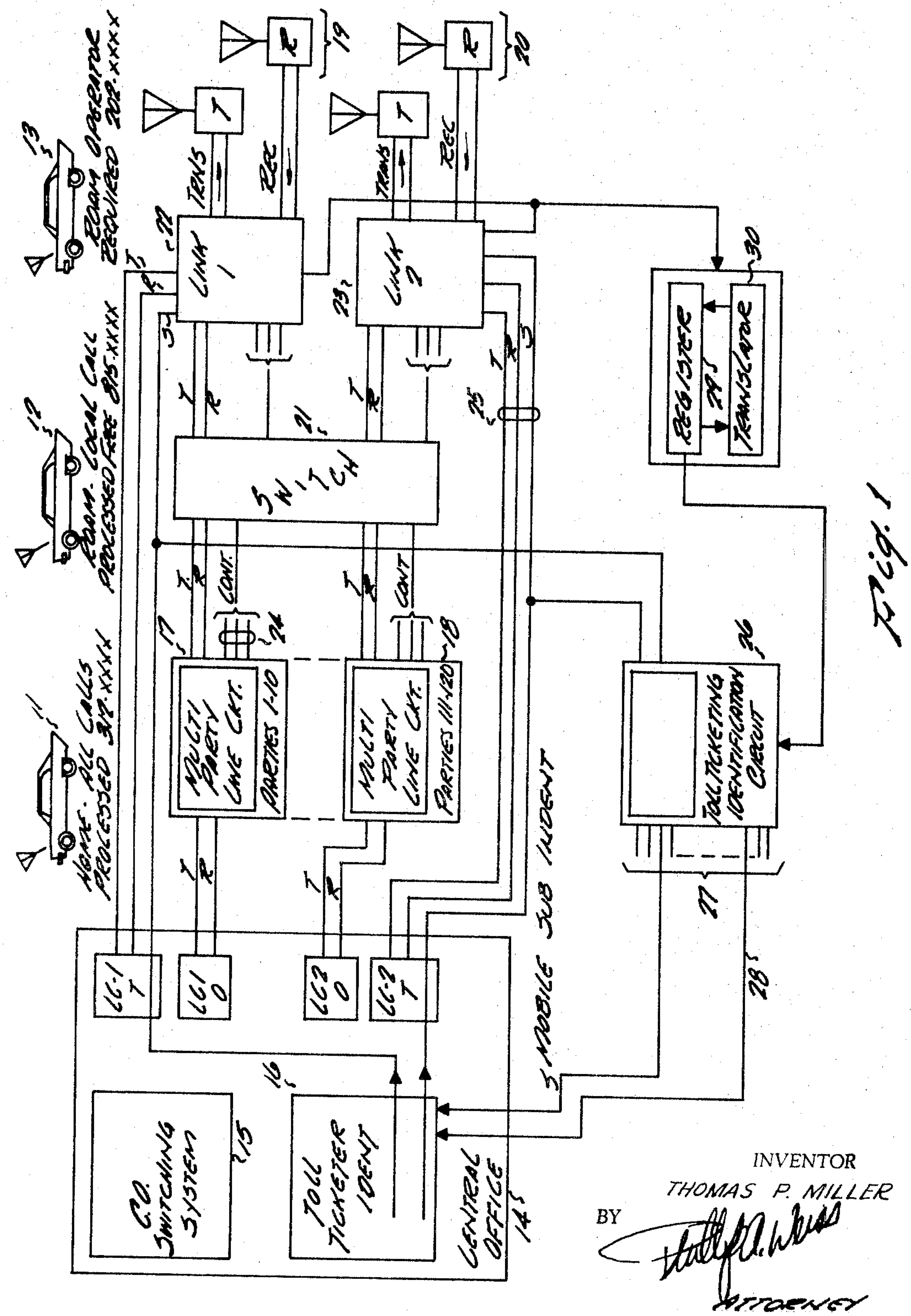

This invention relates in general to translators and more particularly to screening translators for use in mobile telephone systems.

Generally, there are more than one class of subscribers equipped with telephone facilities, and it is necessary to screen calls according to the class of service that is allowed to the calling subscriber. With the advent of direct distance dialing, this screening is very often determined by the area code of the calling subscriber.

While area codes have general utility for all subscribers, they are particularly important to mobile subscribers because they can roam into different areas of service. For example, there is the local based, mobile telephone subscriber. All of the calls initiated by this type of subscriber are processed whether local or long distance, direct distance dialing or toll ticketing. That is, this first class of subscriber is entitled to extended area service. A second class of subscriber is the roam-permitted subscriber who is allowed to make all local calls but is not granted extended area service. A third class of subscriber is the roam foreigner—all of whose calls are routed directly to the operator. Therefore the problem is to identify the class of service allowed to each calling subscriber and to modify his calling capability accordingly.

In large conventional land based switching systems, an identifier circuit screen the calls initiated by a subscriber to determine the class of service that he is entitled to receive. This is done by a matrix of components connected to the line circuit of each subscriber to identify his telephone number. In smaller systems, such as single channel mobile telephone systems, it is not economical to utilize the type of identifier that is capable of identifying each of 10,000 subscribers.

Accordingly, an object of this invention is to provide new and unique screening translators for identifying calling subscribers. In this connection, an object is to provide such a translator for use in mobile telephone systems.

Another object of this invention is to provide a "nor" translator.

A related object of this invention is to provide a translator capable of screening area codes for functional enablement.

Yet another object of this invention is to provide a party line, mobile telephone system wherein a party line subscriber is able to place a call although another subscriber on the same party line is also talking.

In accordance with one preferred embodiment of this invention, a mobile telephone system is provided with a translator working as a "nor" gate to screen mobile originated calls according to the class-of-service given to a calling subscriber. The translator comprises a coordinate array of horizontal and vertical buses. The horizontal buses are programmed with crosspoints wired in nor logic according to the code elements in the area code of the calling subscriber directory number. The vertical buses convert this area code into the corresponding class-of-service which is to be given to the calling subscriber. Enabling output signals are provided by the translator if the vertical buses corresponding to the class-of-service of the calling subscriber are not energized. Conversely, inhibiting signals are provided if the vertical buses are energized.

Figure 2:
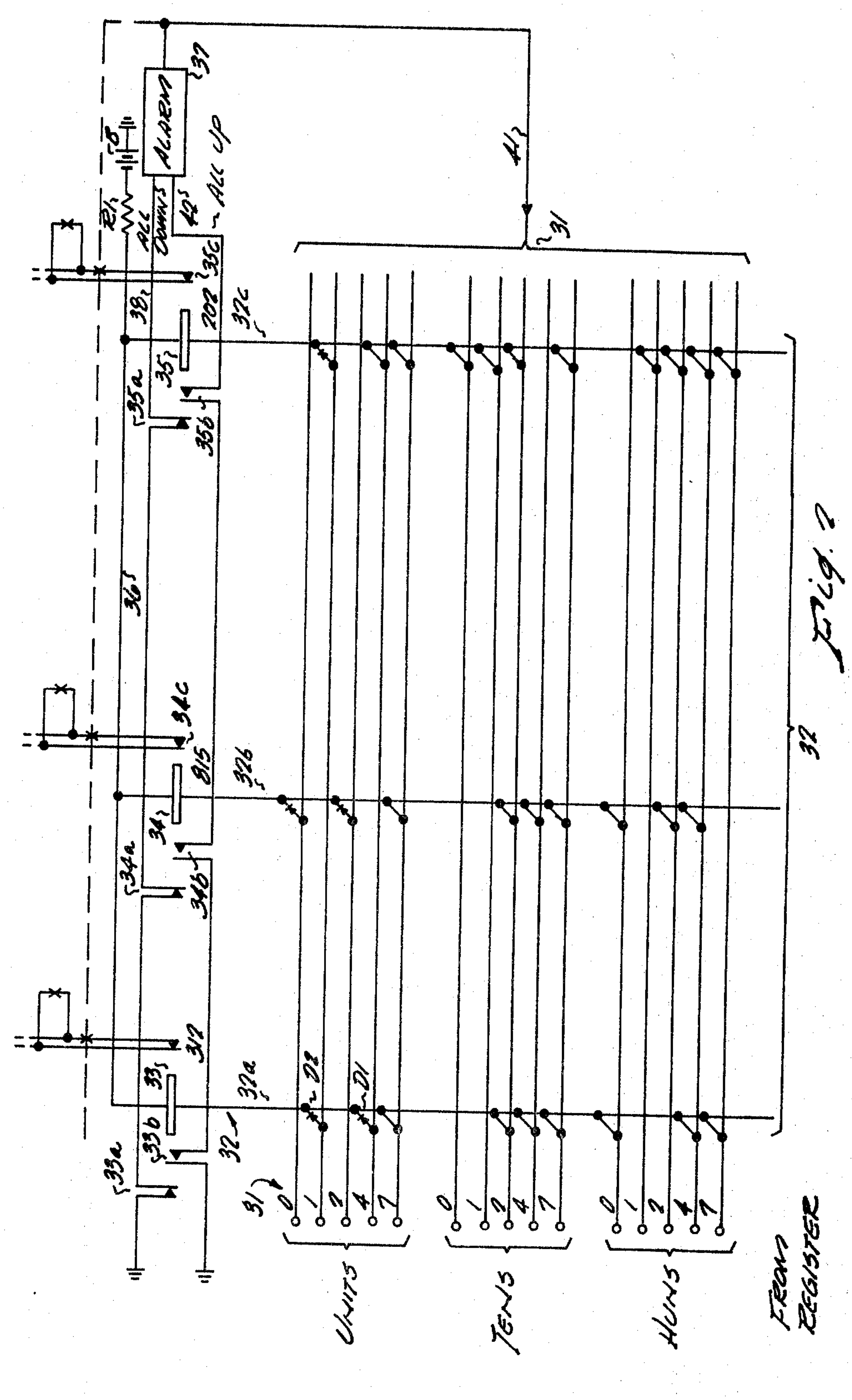

The above mentioned and other objects and features of the invention will become more apparent and the invention itself will be best understood when taken in conjunction with the accompanying drawings in which:

FIG. 1 shows, in block diagram form, a mobile telephone system incorporating the inventive screening translator; and FIG. 2 schematically shows details of the inventive translator.

In FIG. 1, three mobile subscribers 11, 12, and 13 are illustrated by way of example there could be any number of subscribers. Each of these subscribers in entitled to a different class of service. For example, subscriber 11 is a home based mobile station and accordingly is entitled to extended area service. Thus, all of subscriber 11's calls are processed. For purposes of explanation, it is assumed that subscriber 11's area code is "312," the code of central office 14.

Subscriber 12 is a roaming subscriber who is out of his home area. However, the assumption is that he is entitled to make free local calls but is not entitled to extended area service. Perhaps he lives in a suburb of the city identified by the area code 312. Thus, if he dials an extended area code, his telephone is connected to an operator position in the local central office 14. For purposes of explanation, it is assumed that subscriber 12's area code is "815."

Subscriber 13 is a roaming subscriber who is far from home and not entitled to any calls in this area. Thus, no matter what number he dials, his telephone is immediately connected to an operator position. For purposes of explanation it is assumed that subscriber 12's office code is "202."

The central office 14 may have equipment of any conventional design. For example, included in the office is a conventional switching system 15 and toll ticketing equipment 16. Conventionally, calls are directed from a calling line through the switching equipment 15 to the line circuits of a called subscriber. Then, ringing current is sent to sound an audible signal at the called station.

If the call is to a mobile subscriber, it is extended through the switching equipment 15 to a line circuit, such as LC1 and LC2, in a conventional manner. Then the central office switching system sends usual ringing current. The line circuit of the called line places its inhibiting busy potential on the switching system 15 to prevent seizure by another call.

Coupled to the originate line circuits are up to twelve multiparty line circuits designed to receive and extend calls on a party line basis. For example, if the exemplary system is adapted to serve one-hundred and twenty mobile subscribers, twelve ten-party line circuits may be provided. If a call is extended to any one of the mobile subscriber parties 1–10 of this one-hundred-and-twenty line group, the central office switching system 15 seizes the originate line circuit LC1 coupled to the multiparty circuit for parties 1–10 located in block 17. In a like manner, if any call is directed to a mobile party line subscriber in group 111–120 of block 17 the lowermost multiparty line circuit 18 is used. Ten other multiparty line circuits (not shown) may receive calls to any of the other mobile party line subscribers.

The exemplary system disclosed herein is a limited service system where only two radio links 19, 20 are provided for communication between the land stations and mobile subscribers. To distribute calls to these two radio links on a maximum availability basis, a switching device 21 of any convenient design is provided to interconnect any one of the multiparty line circuits such as circuits 17, 18 with either of the radio links. The voice connections are completed from the line circuit LC1 or LC2 to the radio links 19, 20 on the well known tip and ring basis. Any suitable number of auxiliary control conductors 24 may also be used.

Interposed between the multiparty line circuits 17 and 18 and the radio equipment 19, 20, are link circuits such as links 22, 23, which provide the interfacing facilities necessary to connect the switching equipment to the radio equipment. Voice signals are sent from the central office 14 through the originate line circuit (LC1), the multiparty line circuit 17, the switch 21, the link circuit 22 and a radio transmitter T to the radio receiver (not shown) in the auto. Voice signals are received from mobile subscribers at a radio receiver R and sent to the central office 14 over a similar path.

According to the invention, the system enables a greater number of simultaneous calls than would be possible on a strict party line basis. For example, only one subscriber in the group 1–10 may receive a call from a land based system. Heretofore, that call would have also made the party line busy and prevented any other subscriber on the line from placing a call. However, the invention allows another party in this same group to place a call despite the fact that a subscriber on his party line is busy. This can be accomplished because the mobile subscriber has access to a separate terminate path which does not go through his originate line circuit. For example, a subscriber may use the path 25 to terminate a call even though his line circuit 17 is busy with a call by a coparty line subscriber in the same party line group. Since this direct path 25 does not go through a subscriber line circuit, there is no associated sleeve lead which is individual to the subscriber station.

To provide a private supervisory wire for each mobile subscriber station, an identifier circuit 26 is coupled between links 22, 23 for marking a control conductor which is individual to the subscriber station. By an inspection of FIG 1, it is seen that each mobile subscriber 11, 12, 13 has a directory number which consists of an area code and four other digits represented by X marks in the drawing. The circuit 26 receives and decodes these four digits. Then it marks one of one-hundred-and-twenty wires 27 which are individual to the calling station. For example, wire 28 identifies the mobile subscriber 11. This wire, therefore, serves as a substitute for a sleeve.

This sleeve may serve any desired use; however, the principal use is to identify local mobile stations who are entitled to make direct distance dialing calls. The identity is then used for the purposes of automatic toll ticketing. There are, however, mobile subscribers 12, 13 who are not from this local area, and they are barred from making direct distance calls. The problem is to screen the incoming calls so that each mobile subscriber is provided with the class of service to which he is entitled. To do this, the prior art has required a decoding translator equipped to identify the three digits of the area code plus any other necessary digits to identify up to 10,000 possible subscribers. This is obviously wasteful of equipment since there are only 12 multiparty line circuits (such as 17, 18).

In keeping with one aspect of the invention means are provided for economically and efficiently screening the three possible types of calls to insure that the proper service is given. More particularly, this means comprises a register 29, a translator 30 and a toll ticket identification circuit 26. The register is conventional in design, and is effectively connected in parallel with any existing registers in the central office 14. The translator is shown more specifically by the details of FIG. 2.

As is best shown in FIG. 2, the translator comprises a coordinate array of horizontal and vertical buses, 31 and 32, respectively. The horizontal buses 31 are assigned the functions of identifying the units, tens, and hundreds digits in an area code. The vertical buses 32 are assigned the functions of recognizing the area codes and, therefore, the class of service required. To be consistant with the above comments, the vertical buses *32a*, *32b*, *32c* are here described as representing the area codes 312, 815 and 202 of subscribers 11–13 respectively. Any other area codes may be represented in a similar manner. While FIG. 2 illustrates a translator using a two-out-of-five input code, any other well known input could be used.

The horizontal buses, depicted in FIG. 2, are grouped into the well known hundreds, tens and units two-out-of five code. These groups of buses receive ground signals from the register 29 (FIG. 1) responsive to the area code three digit signals which are automatically sent by equipment in a calling mobile subscriber station.

Each of the vertical buses, such as buses *32a*, *32b*, and *32c* terminates in a control relay, such as relays 33, 34, and 35, respectively. Each of these relays is coupled to a battery B through a lead 36 and resistor R1. Suitable components, such as diodes D1, D2 interconnect the horizontal and vertical buses to effect the desired translation from horizontal to vertical buses. For convenience of draftings, only two exemplary diodes are shown with the usual diode symbology, the other diodes are depicted by slanted lines connecting the horizontal and vertical buses. Moreover, it should be understood that it is within the scope of this invention to use other crosspoint components such as PNPN diodes or even direct connection between the horizontal and vertical buses, depending upon the equipment needs.

As will become more apparent, the translation is on the basis of a NOR gate operation. Thus, equipment must operate when a signal does not occur at a particular time. Hence, a trouble condition resulting in failure to respond might appear as a positive command signal and this can not be allowed on a routine basis. Therefore, the operation of the translator is checked before every translation, and an alarm is given if a fault is detected.

Means are provided for routinely checking the operation of the translator before every call. More particularly, an alarm circuit 37 is provided to ascertain that the control relays 33–35 are operating properly. Through all-down conductor 38, the alarm circuit is connected to a serially arranged set of break contacts *33a*, *34a* and *35a* on each of the relays 33–35. Thus, an appearance at the alarm circuit 37 of a ground potential on conductor 38 indicates to the alarm circuit 37 that all relays are down. When a ground is not received over conductor 38 during all-down test, the alarm circuit 37 sends an alarm.

Similarly, the alarm circuit tests for an all-up condition via a lead 42 which is connected to a serially arranged set of make contacts on each of the relays 33–34. To do this, the alarm circuit 37 applies ground to all of the horizontal buses over conductor 41 during the all-up test period. Responsive to this ground potential on all of the horizontal buses, each of the control relays 33–34 operates and closes the normally open relay contacts *33b*, *34b* and *35b*. Ground is thereby applied to the alarm circuit 37 over the "all-up" conductor 42. If any of these relays fail to operate, the alarm circuit does not receive the ground signal and gives an alarm in any well known manner. This way, it is almost certain that no more than one call will ever be screened improperly owing to a fault response simulating a NOR condition.

The nature of the translator will be understood best by a description of, first, a land-to-mobile call, and then, a mobile-to-land call.

To extend a call to a mobile subscriber, a calling subscriber (either land or mobile) operates the central office switching system 15 and causes it to seize an originate line circuit such as LCO–1 in the same manner that any line circuit is seized. The originate line circuit LCO–1 is connected directly to the multiparty line circuit 17 over conventional tip and ring connectors. The multiparty circuit seizes either one of the radio links 19, 20, whichever is idle and available. Signals are then transmitted via the radio link to signal the called subscriber station which is individual to the line circuit LCO–1 seized by the switching system.

The line circuit LCO–1 returns a busy signal to prevent the system 15 from seizing this party line. Thus, if there is a call to any one of the subscribers 1–10, none of the other subscribers 1–10 can be called because the line circuits serving them are marked busy.

Suppose that a second mobile party line subscriber in the same group wishes to place a call. A connection is extended over the idle radio channel to the idle interfacing link 22 or 23. For example, if the outgoing call was via link 22, the incoming call will be via link 23. Link 23 uses the separate terminate path 25 to reach a terminate line circuit designated LCT–2 in the central office.

The mobile station is adapted to automatically send control signals which identify it to the central office. These are the directory number and area code (321–XXXX for subscriber 11). These signals are sent automatically when the central office returns dial tone. Link 23 also receives subscriber sent control signals (which may be the usual dial pulses) adapted to control the central office switching system.

The calls are screened according to the first group of the automatically sent identification pulses which are the mobile calling subscriber's area code. First, these control pulses are stored in the register 29. Then the register calls in the translator 30. If the calling subscriber is in his home area, i.e., the received area code is "312" in this example, the translator 30 causes the register 29 to send a signal to the local tool ticketing identification circuit 26 which utilizes the mobile subscriber identifying digits "XXXX" stored in register 29 to mark a particular outgoing sleeve in the group 27 of sleeves. This sleeve mark is used to make a toll ticket charging the calling mobile subscriber call in the same manner that all toll tickets are made. On the other hand, if the calling subscriber is a class 1 roamer (i.e., the translated area code digits are the area code 815 in this example), the translator 30 applies suitable signals to the register 29. The register then monitors the subscriber sent dial pulses as they are received over radio links from the mobile subscriber.

If the register recognizes these dial pulses as the directory number of a local called subscriber line, it allows the call to proceed. If it recognizes the dial pulses as a toll call, the register switches the call to an operator position.

Finally, if the calling subscriber is a class 2 roamer (i.e, the area code 202, in this example), the translator 30 recognizes the area code as one which is not allowed to place any free calls in this area. The call is forwarded to an operator for appropriate action.

The manner in which the screening translator functions is shown in FIG. 2. If, for example, the calling mobile subscriber having an area code "312" initiates a call, the register 29 places a ground signal on the 1 and 2 horizontal buses of the hundreds group, on the 0 and 1 horizontal buses of the tens group, and on the 0 and 2 horizontal buses of the units group. It is to be noted that these are the horizontal buses which are not connected to the first vertical buses 32*a* that represents the area code "312." Thus, relay 33 is not operated. On the other hand, buses 32*b* and 32*c* are grounded. For example, bus 32*b* is grounded by the potential placed on the horizontal "2" bus in the hundreds group. This and other ground potentials energize the vertical bus 32*b* and operate the relay 34 over an obvious circuit. The operation of relay 34 causes contacts 34*c* to open. In a similar manner, relay 35 is operated to open contacts 35c responsive to ground appearing on the hundreds "1" bus and elsewhere. Thus, relays 34 and 35 operate responsive to the area code indicating that the calling subscriber is entitled to extended area service.

In a similar manner, if the area code received from the calling subscriber is "815," relays 33 and 35 operate while relay 34 does not operate. In greater detail, when the calling subscriber's area code is "815" the register sends ground signals on the "1" and "7" horizontal buses in the hundreds group, on the "0" and "1" horizontal buses in the tens group and on the "1" and "4" horizontal buses in the units group. By inspection, it is seen that relays 33, 35 operate this, but the relay 34 does not operate.

Thus, it is apparent that, with the inventive translator, only one relay, per translation, is necessary. Whereas, in prior art translators, a series circuit through a tree of relay contacts would be necessary to perform the same translation functions. The advantage is a low cost translator which screens calls in terms of a few functions instead of the prior art translators which screened calls in terms of many lines.

While the principles of the invention have been described above in connection with specific apparatus and applications, it is to be understood that this description is made only by way of example and not as a limitation on the scope of the invention.

I claim:

1. A direct distance dialing telephone system comprising a NOR logic translator means for screening originating calls according to the class of service given to a calling subscriber, said translator comprising a coordinate array of buses, means for programming certain buses with crosspoints wired in NOR logic according to the code elements in the area code of calling subscriber director numbers, other of the buses representing area codes, and means responsive to signals applied to said certain buses for enabling or inhibiting various circuits associated with said other buses to give selected classes-of-service available to calling subscribers in accordance with the area code of the calling subscriber.

2. The system of claim 1, and a plurality of party line subscribers, a plurality of party line circuits in the system, one party line being associated with each party line circuit, means associated with each party line circuit for preventing calls in a first direction to any subscriber served by that party line while another subscriber in his group is using the party line, and means for extending calls in a second direction from a subscriber served by the party line despite the fact that a subscriber station in the party line group is busy.

3. The system of claim 1 and a plurality of control relays associated with said other buses, means for routinely checking the operation of the translator before processing each call comprising an alarm circuit having means for ascertaining that all control relays are releasing properly through an all-down test, and means for ascertaining that all control relays are operating properly through a test for an all-up condition.

4. A mobile telephone system comprising a plurality of mobile subscriber stations which may roam outside of their home areas, means associated with each mobile station for transmitting station identifying signals each time that a mobile call is placed, some of said signals identifying the area code of the mobile station's home area, means comprising a NOR logic translator for screening originating calls responsive to said area codes to establish the class of service given to a calling subscriber, said translator comprising a coordinate array of buses programmed with crosspoints wired in NOR logic according to the code elements in the area codes of the mobile stations, and means responsive to signals applied to certain of said buses for enabling or inhibiting various classes-of-service in accordance with the area code of the mobile subscriber.

5. The mobile telephone system of claim 4 and a plurality of multiparty line circuits in the land based portion of said mobile system individually associated with each party line group of mobile subscribers, means associated with each multiparty line circuit for preventing land-to-mobile calls to any subscriber while another subscriber in his group is using the party line, and means for extending mobile-to-land calls from a calling mobile station despite the fact that another subscriber station in the party line group is busy.

6. The mobile telephone system of claim 4 and means for routinely checking the operation of the translator before processing each call, an alarm circuit, means in said alarm circuit for testing all control circuits in said NOR logic translator for normal condition through all-down test, and means in said alarm circuit for thereafter operating all said control circuits to an off normal condition causing a test for an all-up condition, and means in said alarm circuit for either processing said call or giving an alarm responsive to the completion of said tests.

7. The mobile telephone system of claim 4 wherein the translator comprises a coordinate array of horizontal and vertical buses, the horizontal buses being energized in coded combination responsive to the receipt of the digits identifying an area code, the vertical buses being read out as a function of the class of service required in accordance with the area code received from the mobile station, means for storing subscriber sent dial pulses, means responsive jointly to the area code read out and the stored dial pulses for completing calls selectively according to whether the calling subscriber is in his home area or a near-by roam area.

8. The mobile telephone system of claim 7 and means jointly responsive to a home area code and stored direct distance dial pulses for causing the mobile system to send a signal to the land based office identifying the mobile subscriber, and means responsive to said signal for making a toll ticket charging said call.

References Cited

UNITED STATES PATENTS

| | | | |
|---|---|---|---|
| 3,009,149 | 11/1961 | McDonald | 179—41 |
| 3,025,354 | 3/1962 | Ost et al. | 179—17 |
| 3,350,507 | 10/1967 | Willrett et al. | 179—18 |

WILLIAM C. COOPER, *Primary Examiner.*

U.S. Cl. X.R.

179—17, 41; 325—55